United States Patent [19]
Nakayama et al.

[11] Patent Number: 6,010,780
[45] Date of Patent: Jan. 4, 2000

[54] MAGNETO-OPTICAL MEMORY MEDIUM

[75] Inventors: Junichiro Nakayama, Shiki-gun; Go Mori, Nara; Michinobu Mieda, Shiki-gun; Akira Takahashi, Nara, all of Japan

[73] Assignee: Sharp Kabushiki Kaisha, Osaka, Japan

[21] Appl. No.: 08/986,994

[22] Filed: Dec. 8, 1997

[30] Foreign Application Priority Data

Dec. 9, 1996 [JP] Japan .................................. 8-328105

[51] Int. Cl.$^7$ ...................................................... G11B 5/66
[52] U.S. Cl. .................. 428/332; 428/336; 428/694 ML; 428/694 MM; 428/694 EC; 428/694 DE; 428/694 SC; 428/694 LE; 428/900; 369/13
[58] Field of Search .................. 428/694 ML, 694 MM, 428/694 EC, 694 DE, 694 SC, 694 LE, 900, 332, 336; 369/13

[56] References Cited

U.S. PATENT DOCUMENTS

| | | | |
|---|---|---|---|
| 5,616,428 | 4/1997 | Nishimura | 428/694 ML |
| 5,631,096 | 5/1997 | Nakajima | 428/694 ML |
| 5,656,384 | 8/1997 | Nishimura | 428/694 ML |
| 5,705,286 | 1/1998 | Hirokane | 428/694 ML |
| 5,707,727 | 1/1998 | Takahashi | 428/332 |

OTHER PUBLICATIONS

Published unexamined patent application, Tokukaihei 6–150418, May 31, 1994.

*Primary Examiner*—Leszek Kiliman
*Attorney, Agent, or Firm*—Dike, Brostein, Roberts & Cushman, LLP; David G. Conlin; William J. Daley, Jr.

[57] ABSTRACT

A magneto-optical memory medium is provided, on a substrate, with a first magnetic layer, which shows in-plane magnetization at room temperature and perpendicular magnetization above a certain temperature, and a second magnetic layer, which shows perpendicular magnetization within a range from room temperature up to its Curie temperature. The first magnetic layer is made up of alternating films of rare earth metals and transition metals. As a result, a magneto-optical memory medium can be provided which has a wide reproducing power margin, and which is able to prevent deterioration of characteristics due to repeated laser projection.

13 Claims, 12 Drawing Sheets ated Japanese Patent Publication No. 6-150418/1994.

MAGNETO-OPTICAL MEMORY MEDIUM

FIELD OF THE INVENTION

The present invention concerns a magneto-optical memory medium for use in optical disks, optical cards, etc., which is capable of performing at least one of optical recording, reproduction, and erasure of information.

BACKGROUND OF THE INVENTION

The storage density of optical memory devices such as magneto-optical disks is dependent on the size of the light beam for recording/reproduction use on the memory medium. Recently, a method for reproduction of storage bits smaller than the diameter of the light beam has been disclosed in Unexamined Japanese Patent Publication No. 6-150418/1994.

A magneto-optical memory medium disclosed in the above publication has a layer of a rare earth metal-transition metal alloy, and basically is composed of a first magnetic layer having characteristics whereby at room temperature it shows in-plane magnetization, while above a certain temperature a transition from in-plane to perpendicular magnetization occurs, and a second magnetic layer having characteristics whereby it shows perpendicular magnetization within a range from room temperature up to its Curie temperature.

With the above structure, when the light beam is projected onto the first magnetic layer during reproduction, the temperature distribution in the area the light beam is projected onto is a Gaussian distribution. As a result, the temperature rises only in an area smaller than the diameter of the light beam (hereinafter "temperature rise area").

This rise in temperature is accompanied, within the temperature rise area, by a shift of the magnetization of the first magnetic layer from in-plane to perpendicular magnetization. At this time, because of exchange coupling between the first and second magnetic layers, the direction of magnetization of the second magnetic layer is copied to the first magnetic layer.

In this way, information stored in the second magnetic layer is copied to the first magnetic layer in accordance with the shift of the magnetization of the temperature rise area of the first magnetic layer, and when the temperature rise area of the first magnetic layer shifts from in-plane to perpendicular magnetization, only the temperature rise area shows the magneto-optical effect. Accordingly, based on the reflected light from the temperature rise area, the information stored in the second magnetic layer is reproduced through the first magnetic layer.

Then, when the light beam moves to reproduce the next storage bit, the area of the storage bit previously reproduced drops in temperature, and shifts from perpendicular to in-plane magnetization. Because of this shift, the area where the temperature has dropped no longer shows the magneto-optical effect, and the magnetization stored in the second magnetic layer, being masked by the in-plane magnetization of the first magnetic layer, will not be reproduced. By this means, contamination of the signal from neighboring bits, which is a source of noise, can be prevented.

As discussed above, since only a temperature rise area having a temperature above a certain level is involved in reproduction, storage bits smaller than the diameter of the light beam can be reproduced, markedly improving storage density.

However, although the foregoing structure enables reproduction of storage bits smaller than the light beam, markedly improving storage density, there is the problem that the reproduction power margin becomes comparatively narrower. Specifically, since setting the reproduction power to a high level increases the area of the temperature rise area, the advantage of increased storage density is lost. Thus the reproduction power cannot be set too high. With a narrow power margin, fluctuations in the laser power can result in inability to record and reproduce information, making design of the recording and reproduction device exceedingly difficult.

A further problem with the foregoing conventional structure is that repeated laser projection tends to lead to deterioration of the characteristics of the first magnetic layer.

SUMMARY OF THE INVENTION

The object of the present invention is to provide a magneto-optical memory medium with a wide reproducing power margin, which is able to prevent deterioration of characteristics due to repeated laser projection.

In order to attain the foregoing object, a magneto-optical memory medium according to the present invention is provided with, on a substrate, a first magnetic layer, which shows in-plane magnetization at room temperature and perpendicular magnetization above a certain temperature, and a second magnetic layer, which shows perpendicular magnetization within a range from room temperature up to its Curie temperature, with the first magnetic layer being composed of alternating films of rare earth metals and transition metals.

In the foregoing magneto-optical memory medium, since at least the first magnetic layer is composed of alternating films of rare earth metals and transition metals, the temperature at which the magnetization of the first magnetic layer shifts is higher than in the conventional alloy structures. Accordingly, even if the light beam is projected onto the magneto-optical memory medium at a higher output than in conventional structures, the CNR (carrier-to-noise ratio) of the reproduction signal can be maintained at a level as high as in the conventional structures, and the reproduction laser margin can be widened. Thus the magneto-optical memory medium will not be likely to malfunction due to fluctuations in laser power, and design of the recording and reproduction device will be easier. Further, the magnetization of the second magnetic layer can be copied to the first magnetic layer more stably, making possible improved reproduction characteristics.

Again, even with repeated laser projection, deterioration of characteristics can be held to a minimum, and the reliability of the magneto-optical memory medium can be improved.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The first embodiment of the present invention will be explained below.

Figure 1:
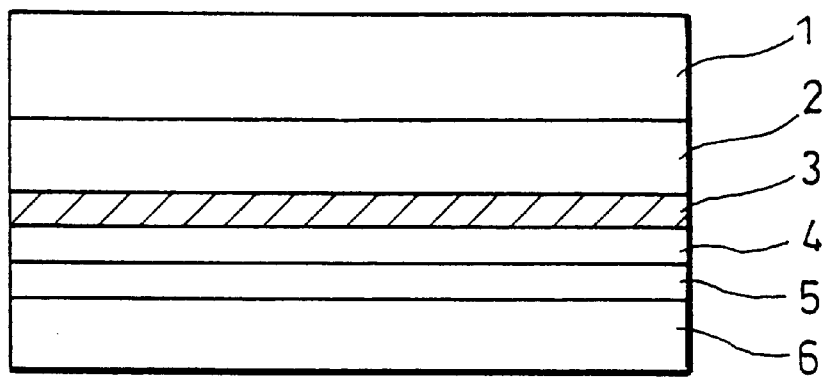
FIG. 1 is an explanatory diagram showing a structure for the magneto-optical memory medium according to the first embodiment of the present invention.

As shown in FIG. 1, the magneto-optical memory medium according to the present embodiment is structured so that a transparent dielectric layer 2, a first magnetic layer 3, a second magnetic layer 4, and a protective layer 5 are layered, in that order, on a transparent substrate 1. Further, an overcoat film 6 is generally provided on the protective layer 5 in order to protect the magneto-optical memory medium. In FIG. 1, and in FIGS. 6, 11, 12, 16, and 19, the layers shown by hatching or cross-hatching have a structure of alternating films of rare earth metals and transition metals.

Figure 2:
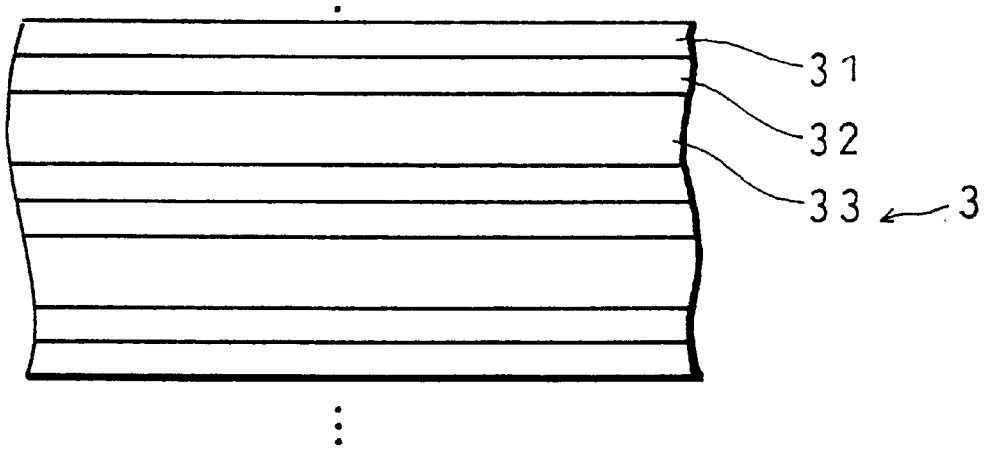
FIG. 2 is a detailed cross-sectional view showing one example of a first magnetic layer of the magneto-optical memory medium shown in FIG. 1.
Figure 3:
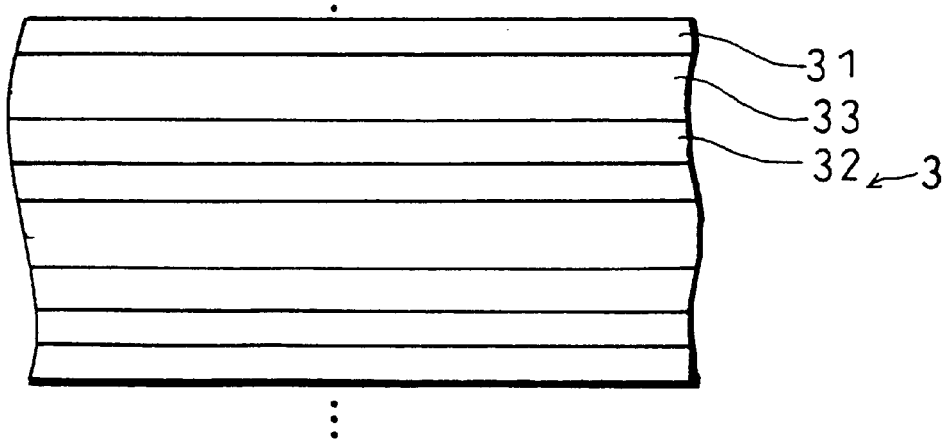
FIG. 3 is a detailed cross-sectional view showing another example of a first magnetic layer of the magneto-optical memory medium shown in FIG. 1.

FIGS. 2 and 3 show detailed cross-sectional views of the first magnetic layer 3. The first magnetic layer 3 is made up of a plurality of alternating rare earth metal and transition metal films. In the examples shown in FIGS. 2 and 3, each rare earth metal film 31 and each transition metal film 32 and 33 is made of a single chemical element, and is provided as a separate film. In these examples, the rare earth metal part is made of a single chemical element (film 31) and the transitional metal part is made of two chemical elements (films 32 and 33), but the number of chemical elements need not be limited to this. Further, in FIGS. 2 and 3, each chemical element forms a separate film, but it is sufficient if the rare earth metals and the transition metals form separate films. For example, the transition metal films 32 and 33 in FIG. 2 could be replaced with a single film made of an alloy of these two transition metals.

In the first magnetic layer 3, the magnetic moments of the rare earth metal and the transition metal have different temperature characteristics. At high temperature, the magnetic moment of the transition metal will be larger than that of the rare earth metal. For this reason, it is assumed that the mass ratio between the rare earth metal and the transition metal is set so that the percentage of rare earth metal is higher than in the case where the compensation temperature $T_{comp}$ is equal to room temperature. If the mass ratio between the rare earth metal and the transition metal in the first magnetic layer 3 is set in this manner, the first magnetic layer 3 shows in-plane magnetization at room temperature. However, when the temperature rises above a certain level, the magnetic moment of the transition metal becomes relatively larger, balancing that of the rare earth metal. Thus, the first magnetic layer 3 shows perpendicular magnetization at this higher temperature.

The second magnetic layer 4, in contrast, shows perpendicular magnetization characteristics within a range from room temperature up to its Curie temperature Tc.

With the structure described above, as shown in FIG. 4, when the light beam is projected onto the first magnetic layer 3 during reproduction, the temperature distribution in the area the light beam is projected onto is a Gaussian distribution, and therefore the temperature only rises above a certain level in an area smaller than the diameter of the light beam. The magnetization of the first magnetic layer 3 in the area in which the temperature rises above a certain level (hereinafter "temperature rise area") then shifts from in-plane to perpendicular magnetization. At this time, because of exchange coupling between the first magnetic layer 3 and the second magnetized layer 4, the direction of magnetization of the second magnetic layer 4 is copied, within the temperature rise area, to the first magnetic layer 3.

When the temperature rise area of the first magnetic layer 3 shifts from in-plane to perpendicular magnetization, only the temperature rise area shows the magneto-optical effect, and, based on the reflected light from the temperature rise area, the information stored in the second magnetic layer 4 is reproduced through the first magnetic layer 3.

Then, when the light beam moves to reproduce the next storage bit, the area of the storage bit previously reproduced drops in temperature, and shifts from perpendicular to in-plane magnetization. Because of this shift, the area where the temperature has dropped no longer shows the magneto-optical effect, and the magnetization stored in the second magnetic layer 4, being masked by the in-plane magnetization of the first magnetic layer 3, will not be reproduced. By this means, contamination of the signal from neighboring bits, which is a source of noise, can be prevented.

With a magneto-optical memory medium of the foregoing structure, since, as discussed above, only a temperature rise area having a temperature above a certain level is involved in reproduction, storage bits smaller than the diameter of the light beam can be reproduced, markedly improving storage density.

As discussed above, the magneto-optical memory medium according to the present embodiment uses, as to at least the first magnetic layer 3, an arrangement of alternating films of each constituent element or alternating films of rare earth metals and transition metals. With this structure of separate films of rare earth metals and transition metals, the temperature at which the magnetization of the first magnetic layer shifts is higher than in the conventional alloy structures. Accordingly, even if the laser is projected onto the magneto-optical memory medium at a higher output than in conventional structures, the CNR (carrier-to-noise ratio) of the reproduction signal can be maintained at a level as high as in the conventional structures. For this reason, the laser power margin can be widened. Further, deterioration of CNR due to repeated reproduction can be held to a minimum.

Next, a concrete example of a magneto-optical memory medium according to the present embodiment will be explained.

In this magneto-optical memory medium, the transparent substrate 1 is made of a polycarbonate disc with an outer diameter of 86 mm, an inner diameter of 15 mm, and a thickness of 1.2 mm. On one surface of the transparent substrate 1 are provided concave guide tracks for guiding the light beam. Each guide track has a track pitch of 1.1 $\mu$m and a groove (concave portion) width of 0.4 $\mu$m, and each land (convex portion) between the grooves is 0.7 $\mu$m wide.

On the surface of the transparent substrate 1 on which the guide tracks are provided are layered, by means of reactive sputtering, the dielectric layer 2 made of AlN of 80 nm thickness, the first magnetic layer 3 made of GdFeCo of 50 nm thickness, the second magnetic layer 4 made of TbFeCo of 50 nm thickness, and the protective layer 5 made of AlN of 40 nm thickness. As shown in FIGS. 2 and 3, the first magnetic layer 3 is made up of alternating Gd films 31, Co films 32, and Fe films 33, and the second magnetic layer 4 is made of a TbFeCo alloy provided by means of simultaneous sputtering of Tb, Fe, and Co targets.

Here, a magneto-optical memory medium in which the films of the first magnetic layer 3, as shown in FIG. 2, are provided from the transparent substrate 1 side in the order Gd film 31, Co film 32, Fe film 33, will be referred to as Sample #1. In Sample #1, each Gd film 31 is approximately 0.6 nm thick, each Co film 32 approximately 0.3 nm thick, and each Fe film 33 approximately 1.1 nm thick. These film thicknesses are values arrived at by calculation, and at the time of actual formation of these films, they are formed with a time and power which would result in these thicknesses. The same holds true for the explanations of other concrete examples below.

Again, a magneto-optical memory medium in which the films of the first magnetic layer 3, as shown in FIG. 3, are provided from the transparent substrate 1 side in the order Gd film 31, Fe film 33, Co film 32, will be referred to as Sample #2. In Sample #2, each Gd film 31 is approximately 0.6 nm thick, each Fe film 33 approximately 1.1 nm thick, and each Co film 32 approximately 0.3 nm thick.

Figure 5:
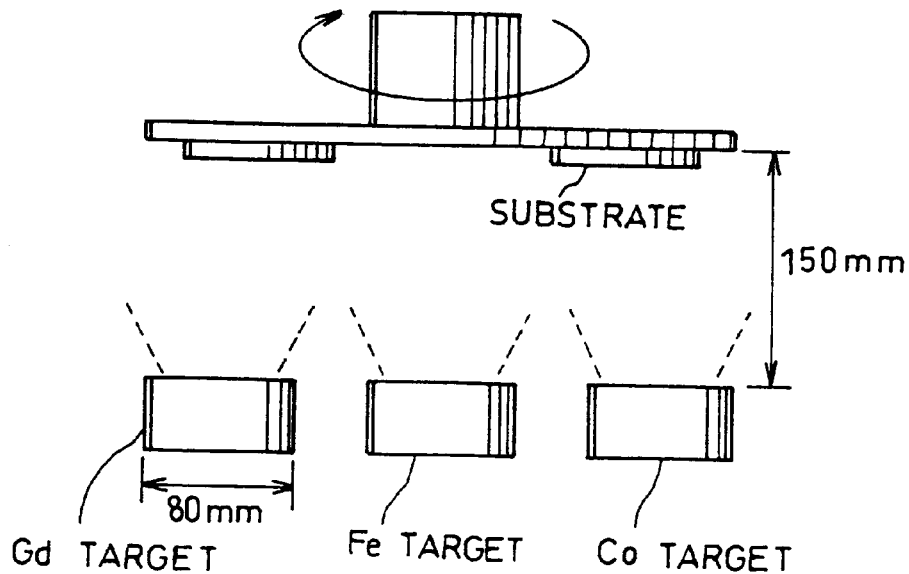
FIGS. 5(a) and 5(b) are explanatory diagrams showing one example of a manufacturing process for the magneto-optical memory medium according to the present invention.
Figure 5:
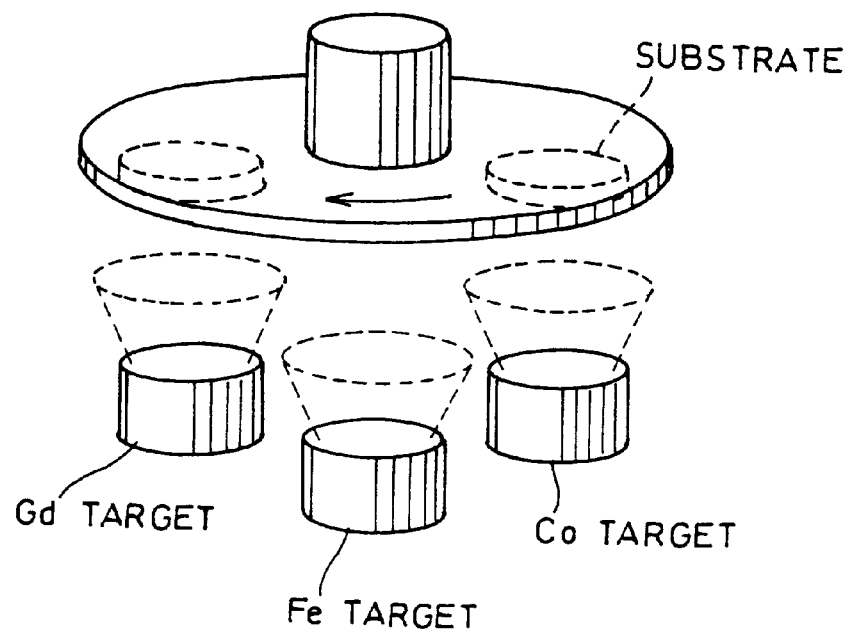

In providing the first magnetic layer 3 by sputtering, the power with which each target is bombarded is proportional to the composition ratio of the respective chemical elements of the first magnetic layer 3, and by controlling the number of revolutions, the first magnetic layer 3 can be multi-layered. To explain in detail, a sputtering device like that shown in FIGS. 5(a) and 5(b) is used (FIG. 5(a) being a cross-sectional view, and FIG. 5(b) a perspective view). To each target of Gd, Fe, and Co is applied power corresponding to the composition ratio of that chemical element in the first magnetic layer 3. The substrate is then revolved so as to pass opposite each target in turn, thus forming thereon the Gd film 31, the Co film 32, and the Fe film 33 of the required thickness.

Since the metal of each target (Gd, Fe, and Co) coats the substrate when the substrate is opposite that target, by making the number of revolutions small enough, each metal is coated onto the transparent substrate 1 in turn. However, the method of providing this multi-layered structure need not be limited to that explained above. For example, this multi-layered structure could also be provided by opening and closing shutters provided on each target shown in FIGS. 5(a) and 5(b).

The sputtering conditions for providing the first magnetic layer 3 and the second magnetic layer 4 are an ultimate vacuum of $2.0 \times 10^{-4}$ Pa or less, Ar gas pressure of $6.5 \times 10^{-1}$ Pa, and a discharge power of 300 W, and for providing the dielectric layer 2 and the protective layer 5, they are an ultimate vacuum of $2.0 \times 10^{-4}$ Pa or less, $N_2$ gas pressure of $3.0 \times 10^{-1}$ Pa, and a discharge power of 800 W.

The overcoat film 6 is provided by coating an acrylate ultraviolet-hardened resin on the protective layer 5, and hardening it by projecting ultraviolet light thereon.

In a magneto-optical memory medium prepared as described above, the first magnetic layer 3 was rare earth metal rich, had a Curie temperature (Tc1) of 275° C., and had characteristics whereby it showed in-plane magnetization at room temperature while showing perpendicular magnetization at approximately 140° C. The second magnetic layer 4 was transition metal rich, had a Curie temperature (Tc2) of 225° C., and at room temperature had a coercive force (Hc2) of 1200 kA/m.

Figure 6:
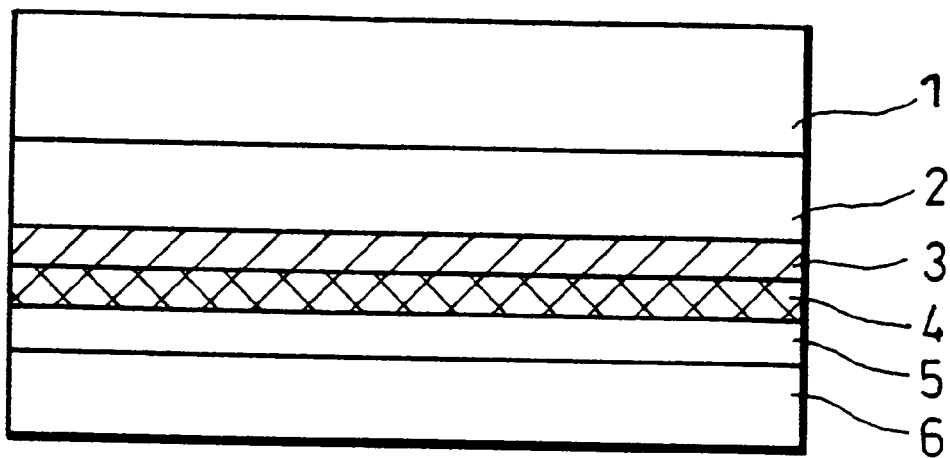
FIG. 6 is an explanatory diagram showing another structure for the magneto-optical memory medium according to the first embodiment of the present invention.
Figure 7:
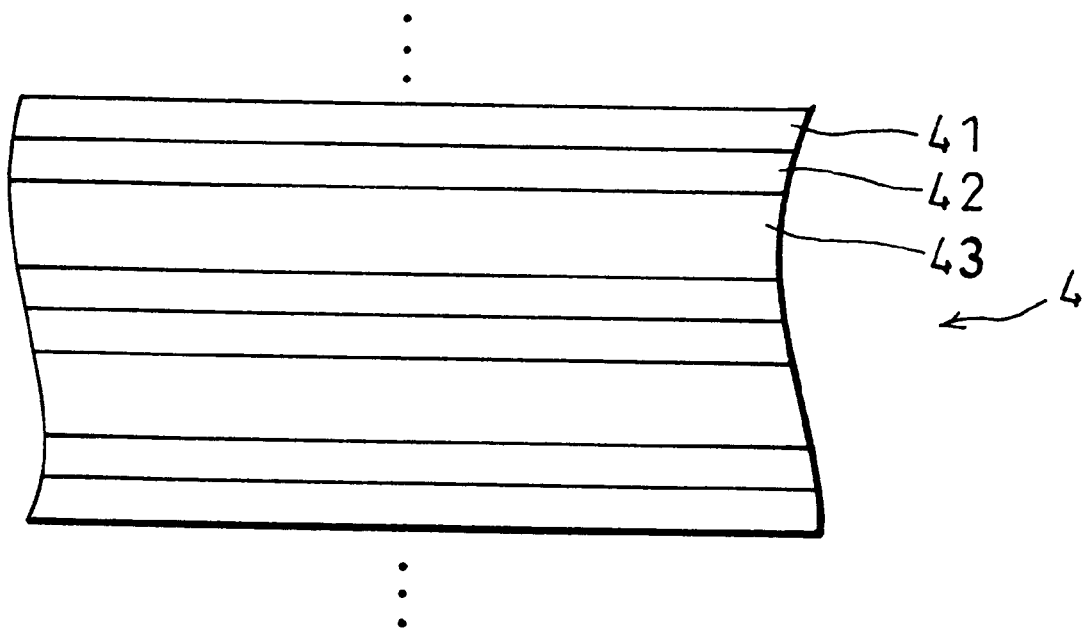
FIG. 7 is a detailed cross-sectional view showing one example of a second magnetic layer of the magneto-optical memory medium shown in FIG. 6.

Next, a magneto-optical memory medium like those of Samples #1 and #2 above, but in which, as shown in FIG. 6, the metals making up the second magnetic layer 4 are also provided as alternating films, will be referred to as Sample #3. In Sample #3, as shown in FIG. 7, these metals are provided from the transparent substrate 1 side in the order Tb film 41, Fe film 42, Co film 43. The remainder of the structure and manufacturing conditions are the same as in Samples #1 and #2. In the second magnetic layer 4, as in the case of the first magnetic layer 3, it is sufficient if the rare earth metals and the transition metals form separate films, and the Fe film 42 and the Co film 43 may be replaced with a single film made of an alloy of these two metals.

Next, with a recording magnetic field (Hw) of −40 kA/m, a light beam with a recording power (Pw) of 6 mW was repeatedly projected onto the magneto-optical memory mediums of Samples #1 through #3, measuring the relation of number of cyclic times to CNR, and the relation of reproducing power to CNR. The recording conditions used at the time of marking the storage bits of the magneto-optical memory mediums were Hw=20 A/m, recording power (Pw)=6 mW, and a recording mark of 0.78 $\mu$m.

Figure 8:
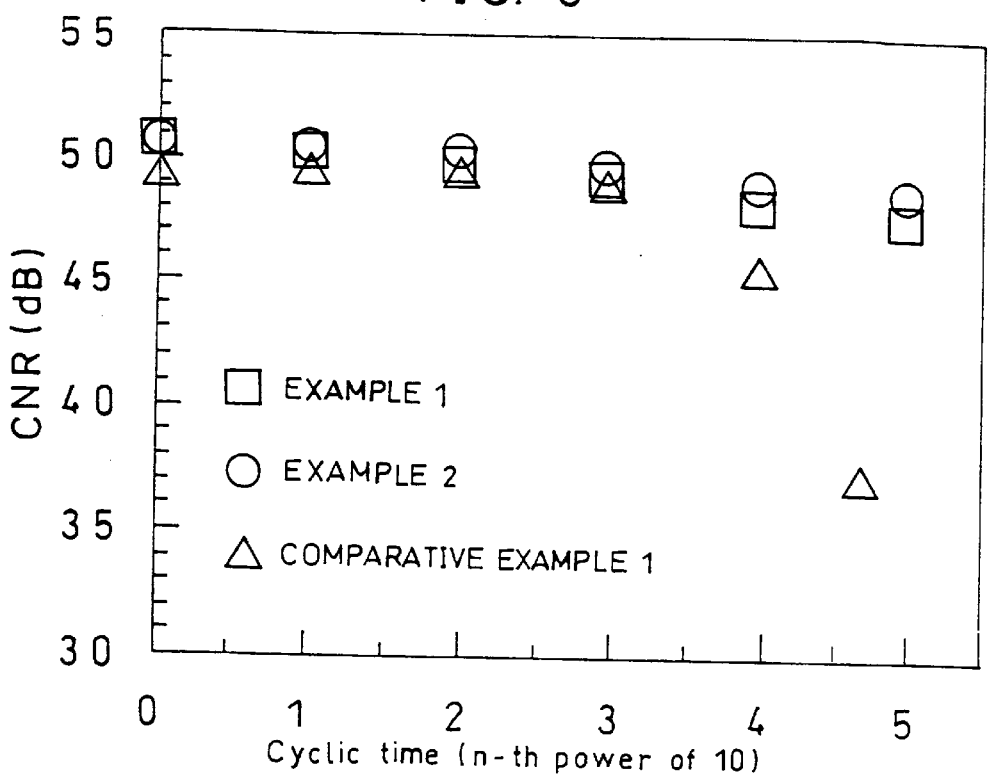
FIG. 8 is an explanatory diagram showing the relation between recording cyclic times and CNR in the magneto-optical memory medium according to the first embodiment of the present invention.
Figure 9:
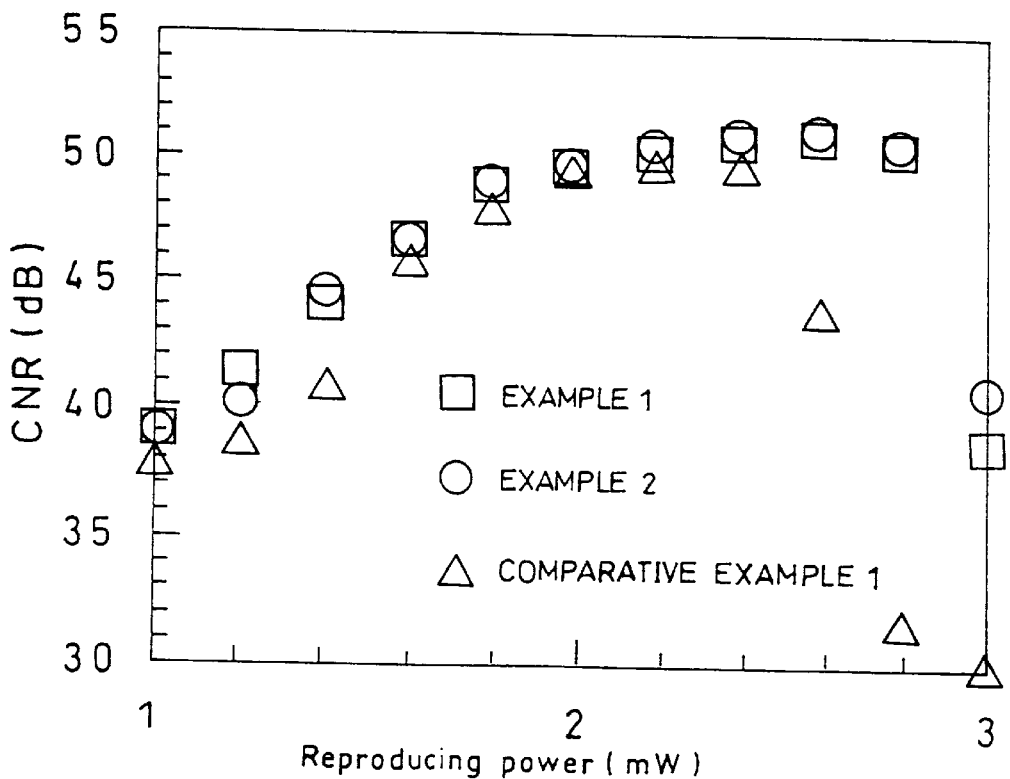
FIG. 9 is an explanatory diagram showing the relation between reproducing power and CNR in the magneto-optical memory medium according to the first embodiment of the present invention.
Figure 10:
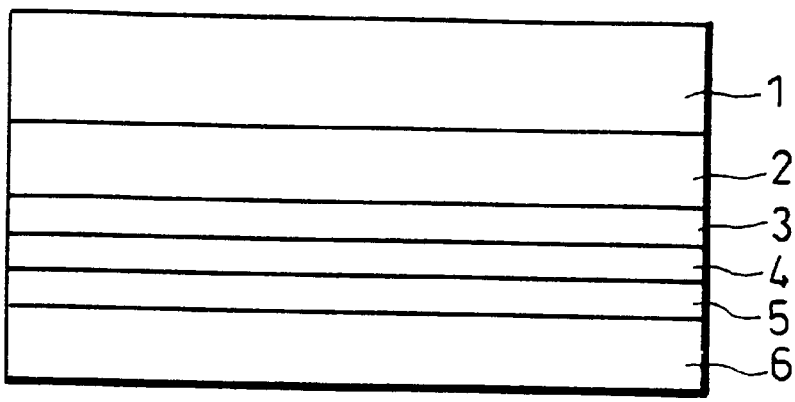
FIG. 10 is an explanatory diagram showing a structure for the magneto-optical memory medium shown in FIGS. 1 and 6, in which neither the first nor second magnetic layer is made up of alternating films of rare earth metals and transition metals.

The results are shown in FIGS. 8 and 9. The characteristics of Samples #1 and #2 were the same, and thus are indicated on FIGS. 8 and 9 as "Example 1," and Sample #3 is indicated as "Example 2." An example of the conventional art is also plotted as "Comparative Example 1." In the magneto-optical memory medium of Comparative Example 1, as shown in FIG. 10, the first magnetic layer 3 and the second magnetic layer 4 are provided as alloys by means of the typical simultaneous sputtering. FIG. 8 shows the relation of number of cyclic times to CNR, and FIG. 9 shows the relation of reproducing power to CNR.

It can be seen from FIG. 8 that the CNRs of Examples 1 and 2 have deteriorated little even after $1\times10^5$ projections, but that of Comparative Example 1 has deteriorated after $5\times10^4$ projections. Further, it can be seen from FIG. 9 that Examples 1 and 2 have wider reproducing power margins (ranges of useable laser power) than does Comparative Example 1. To be more specific, Example 2 has a higher CNR than Example 1 in both FIGS. 8 and 9.

From the foregoing results, it can be seen that a first magnetic layer 3 made up of alternating films of rare earth metals and transition metals instead of the conventional alloy can increase the reproducing power margin and prevent deterioration of the characteristics of the first magnetic layer 3 due to repeated laser projection. In addition, the CNR can be further improved by using a multi-layered structure for the second magnetic layer 4 as well.

Second Embodiment

The second embodiment of the present invention will be explained below.

Figure 11:
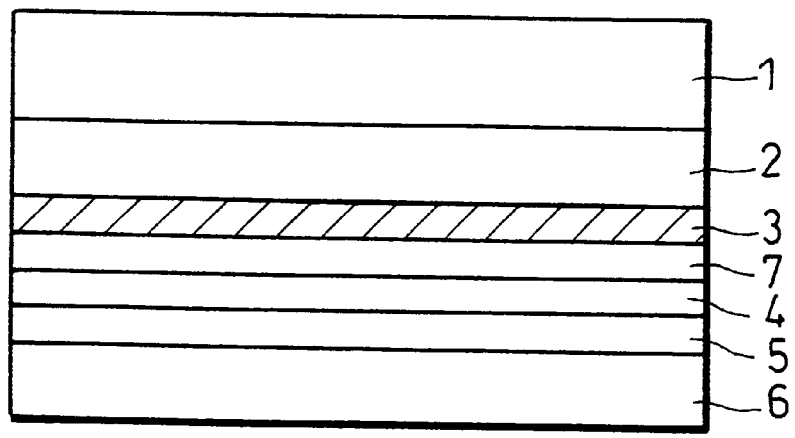
FIG. 11 is an explanatory diagram showing a structure for the magneto-optical memory medium according to the second embodiment of the present invention.

As shown in FIG. 11, the magneto-optical memory medium according to the present embodiment is structured so that a transparent dielectric layer 2, a first magnetic layer 3 (for reproduction), a dielectric layer 7, a second magnetic layer 4 (for recording), and a protective layer 5 are layered, in that order, on a transparent substrate 1. Further, an overcoat film 6 is generally provided on the protective layer 5 in order to protect the magneto-optical memory medium. The first magnetic layer 3 is made up of a plurality of alternating rare earth metal and transition metal films.

The reproduction principle of the magneto-optical memory medium in the present embodiment is substantially the same as that of the first embodiment. In the temperature rise area of the first magnetic layer 3, the direction of magnetization of the second magnetic layer 4 is copied to the first magnetic layer 3 due to the magnetic field produced by the second magnetic layer 4. In particular, since the first magnetic layer 3 and the second magnetic layer 4 are separated from each other by the dielectric layer 7, the structure of the present embodiment avoids interference between adjacent magnetic layers at the interface thereof. For this reason, the magneto-optical memory medium according to the present embodiment is able to improve the CNR and limit crosstalk.

Next, a concrete example of a magneto-optical memory medium according to the present embodiment will be explained.

In this magneto-optical memory medium, the transparent substrate 1 is made of a polycarbonate disc with an outer diameter of 86 mm, an inner diameter of 15 mm, and a thickness of 1.2 mm. On one surface of the transparent substrate 1 are provided concave guide tracks for guiding the light beam. Each guide track has a track pitch of 1.1 $\mu$m and a groove (concave portion) width of 0.4 $\mu$m, and each land (convex portion) between the grooves is 0.7 $\mu$m wide.

On the surface of the transparent substrate 1 on which the guide tracks are provided are layered, by means of reactive sputtering, the dielectric layer 2 made of AlN of 80 nm thickness, the first magnetic layer 3 of 20 nm thickness made of alternating Gd films 31, Fe films 33, and Co films 32 (each Gd film 31 approx. 0.6 nm, each Co film 32 approx. 0.3 nm, each Fe film 33 approx. 1.1 nm), the dielectric layer 7 made of AlN of 20 nm thickness, the second magnetic layer 4 made of TbFeCo of 50 nm thickness, and the protective layer 5 made of AlN of 40 nm thickness. As shown in FIGS. 2 and 3, the Gd films 31, Co films 32, and Fe films 33 alternate with each other, and the second magnetic layer 4 is made of a TbFeCo alloy provided by means of simultaneous sputtering of Tb, Fe, and Co targets.

Here, a magneto-optical memory medium in which the films of the first magnetic layer 3, as shown in FIG. 2, are provided from the transparent substrate 1 side in the order Gd film 31, Co film 32, Fe film 33, will be referred to as Sample #4.

Again, a magneto-optical memory medium in which the films of the first magnetic layer 3, as shown in FIG. 3, are provided from the transparent substrate 1 side in the order Gd film 31, Fe film 33, Co film 32, will be referred to as Sample #5.

The sputtering conditions for providing the first magnetic layer 3 and the second magnetic layer 4 are an ultimate vacuum of $2.0\times10^{-4}$ Pa or less, Ar gas pressure of $6.5\times10^{-1}$ Pa, and a discharge power of 300 W, and for providing the dielectric layers 2 and 7 and the protective layer 5, they are an ultimate vacuum of $2.0\times10^{-4}$ Pa or less, $N_2$ gas pressure of $3.0\times10^{-1}$ Pa, and a discharge power of 800 W.

The overcoat film 6 is provided by coating an acrylate ultraviolet-hardened resin on the protective layer 5, and hardening it by projecting ultraviolet light thereon.

In a magneto-optical memory medium prepared as described above, the first magnetic layer 3 was rare earth metal rich, had a Curie temperature (Tc1) of 275° C., and had characteristics whereby it showed in-plane magnetization at room temperature while showing perpendicular magnetization at approximately 140° C. The second magnetic layer 4 was transition metal rich, had a Curie temperature (Tc2) of 225° C., and at room temperature had a coercive force (Hc2) of 1200 kA/m.

Figure 12:
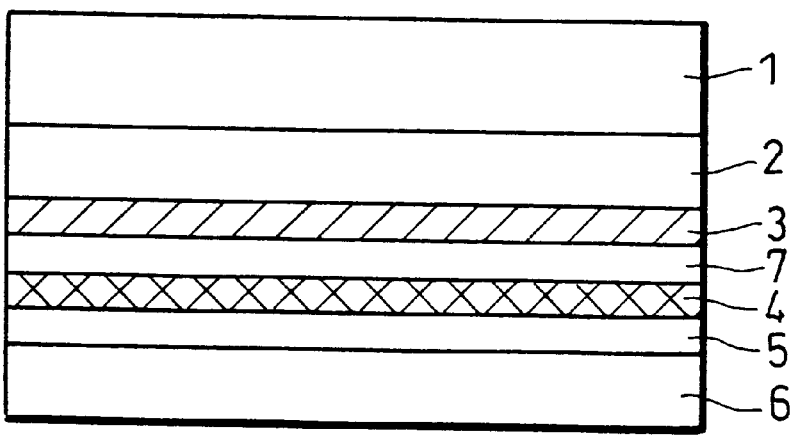
FIG. 12 is an explanatory diagram showing another structure for the magneto-optical memory medium according to the second embodiment of the present invention.

Next, a magneto-optical memory medium like those of Samples #4 and #5 above, but in which, as shown in FIG. 12, the metals making up the second magnetic layer 4 are also provided as alternating films, will be referred to as Sample #6. In Sample #6, as shown in FIG. 7, these metals are provided from the transparent substrate 1 side in the order Tb film 41, Fe film 42, Co film 43. The remainder of the structure and manufacturing conditions are the same as in Samples #4 and #5. In the second magnetic layer 4, as in the case of the first magnetic layer 3, it is sufficient if the rare earth metals and the transition metals form separate films, and the Fe layer 42 and the Co film 43 may be replaced with a single film made of an alloy of these two metals.

Next, with a recording magnetic field (Hw) of −40 kA/m, a light beam with a recording power (Pw) of 6 mW was repeatedly projected onto the magneto-optical memory mediums of Samples #4 through #6, measuring the relation of number of cyclic times to CNR, and the relation of reproducing power to CNR. The recording conditions used at the time of marking of the storage bits of the magneto-optical memory mediums were Hw 20 kA/m, recording power (Pw)=6 mW, and a recording mark of 0.78 $\mu$m.

Figure 13:
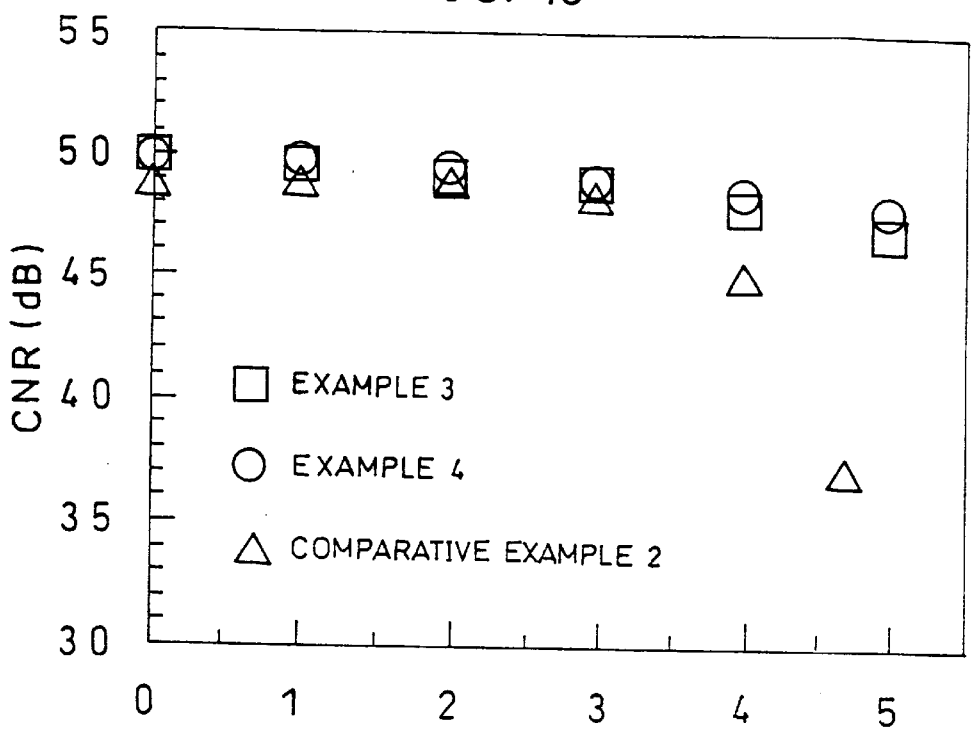
FIG. 13 is an explanatory diagram showing the relation between recording cyclic times and CNR in the magneto-optical memory medium according to the second embodiment of the present invention.
Figure 14:
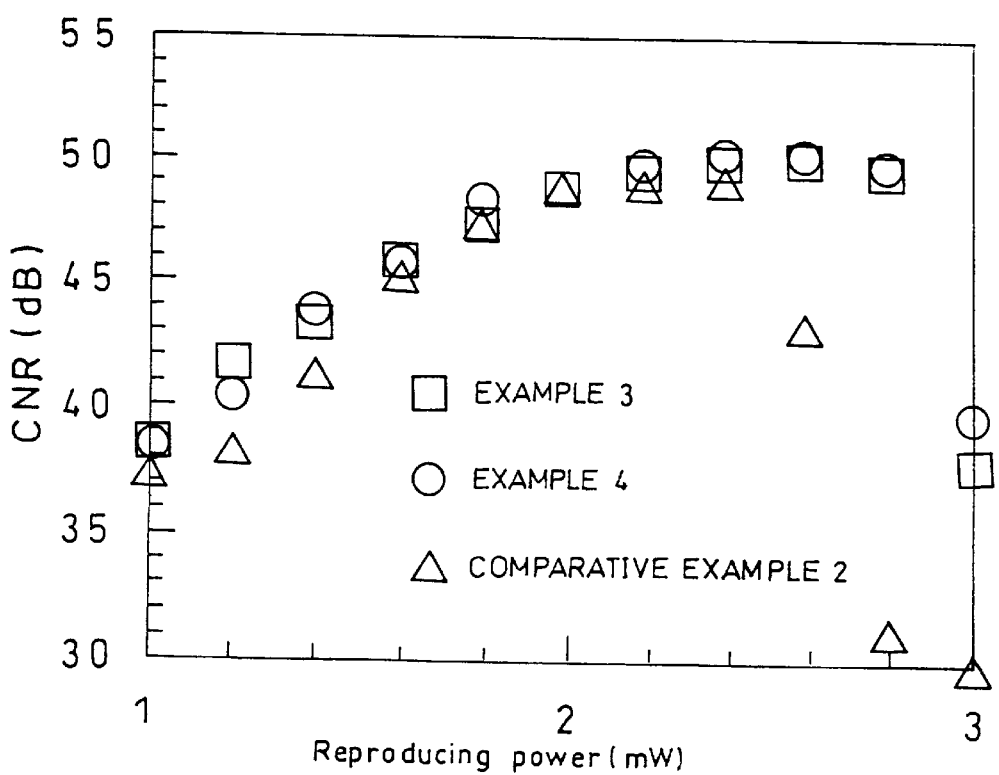
FIG. 14 is an explanatory diagram showing the relation between reproducing power and CNR in the magneto-optical memory medium according to the second embodiment of the present invention.
Figure 15:
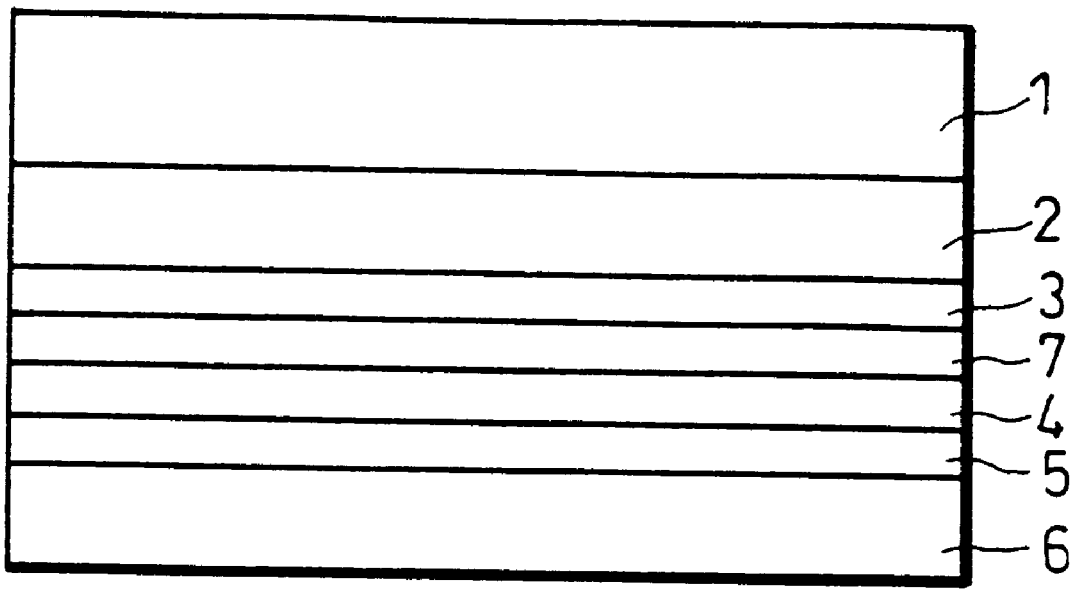
FIG. 15 is an explanatory diagram showing a structure for the magneto-optical memory medium shown in FIGS. 11 and 12, in which neither the first nor second magnetic layer is made up of alternating films of rare earth metals and transition metals.

The results are shown in FIGS. 13 and 14. The characteristics of Samples #4 and #5 were the same, and thus are indicated on FIGS. 13 and 14 as "Example 3," and Sample #6 is indicated as "Example 4." An example of the conventional art is also plotted as "Comparative Example 2." In the magneto-optical memory medium of Comparative Example 2, as shown in FIG. 15, the first magnetic layer 3 and the second magnetic layer 4 are provided as alloys by means of the typical simultaneous sputtering. FIG. 13 shows the relation of number of cyclic times to CNR, and FIG. 14 shows the relation of reproducing power to CNR.

It can be seen from FIG. 13 that the CNRs of Examples 3 and 4 have deteriorated little even after $1\times10^5$ projections, but that of Comparative Example 2 has deteriorated after $5\times10^4$ projections. Further, it can be seen from FIG. 14 that Examples 3 and 4 have wider reproducing power margins (ranges of useable laser power) than does Comparative Example 2.

From the foregoing results, it can be seen that a first magnetic layer 3 made up of alternating films of rare earth metals and transition metals instead of the conventional alloy can increase the reproducing power margin and prevent deterioration of the characteristics of the first magnetic layer 3 due to repeated laser projection. Further, by providing the dielectric layer 7 between the first magnetic layer 3 and the second magnetic layer 4, the present embodiment enables reproduction characteristics with high SNR (signal-to-noise ratio) at a comparatively lower recording magnetic field.

Third Embodiment

The magneto-optical memory medium according to the third embodiment of the present invention will be explained below.

Figure 16:
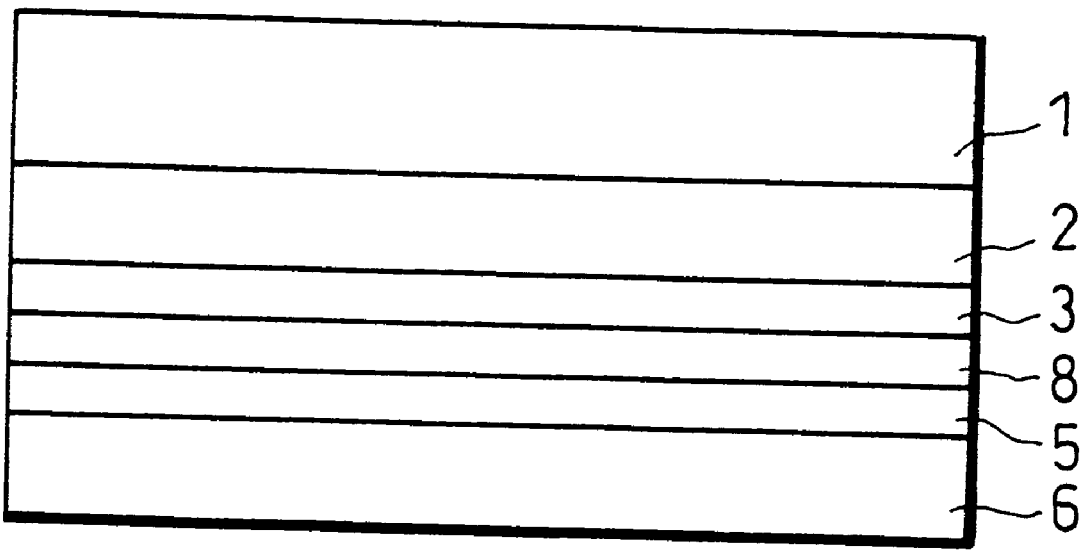
FIG. 16 is an explanatory diagram showing a structure for the magneto-optical memory medium according to the third embodiment of the present invention.

As shown in FIG. 16, the magneto-optical memory medium according to the present embodiment is structured so that a transparent dielectric layer 2, a first magnetic layer 3, a second magnetic layer 8, and a protective layer 5 are layered, in that order, on a transparent substrate 1. Further, an overcoat film 6 is generally provided on the protective layer 5 in order to protect the magneto-optical memory medium.

Figure 17:
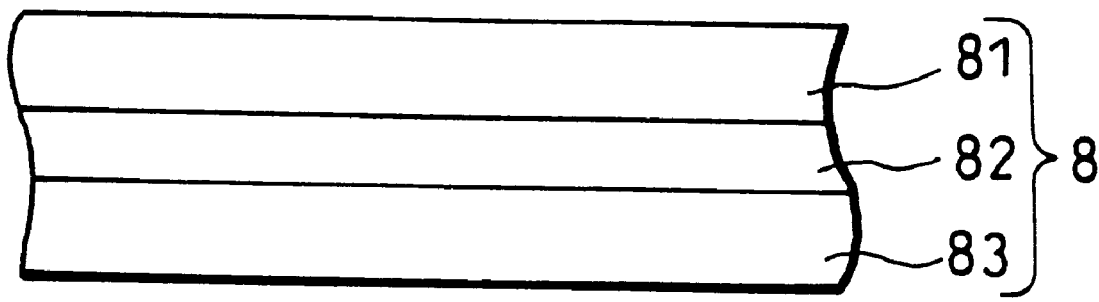
FIG. 17 is a detailed cross-sectional view showing one example of a second magnetic layer of the magneto-optical memory medium shown in FIG. 16.

The first magnetic layer 3 is made up of a plurality of alternating rare earth metal and transition metal films. Further, as shown in FIG. 17, the second magnetic layer 8 is made up of a recording layer 81, an intermediate layer 82, and a recording supplement layer 83. By means of the second magnetic layer 8, the magneto-optical memory medium according to the present embodiment is capable of light modulation overwrite recording.

Figure 4:
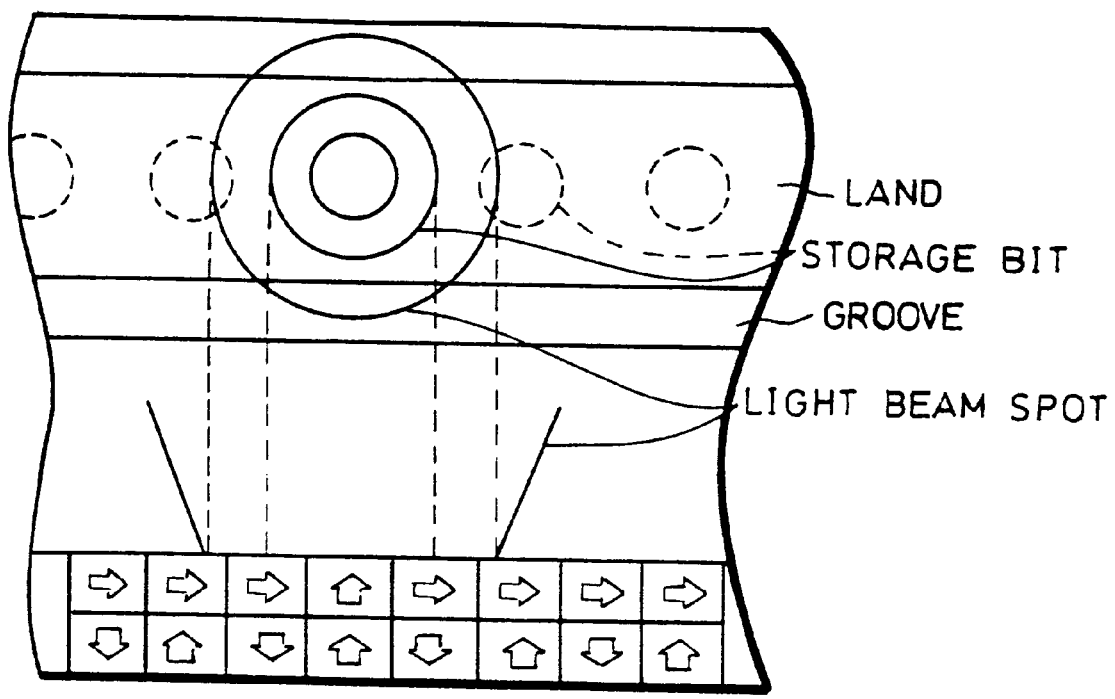
FIG. 4 is an explanatory diagram showing the reproduction principle of the magneto-optical memory medium according to the present invention.

The reproduction principle of the magneto-optical memory medium in the present embodiment is substantially the same as those of the first and second embodiments shown in FIG. 4, but since there is no second magnetic layer 4 in the present embodiment, the recording layer 81 plays the same role as the second magnetic layer 4 in the other embodiments. In other words, the recording layer 81, like the second magnetic layer 4, has characteristics whereby it shows perpendicular magnetization within a range from room temperature up to its Curie temperature.

Here, light modulation overwrite recording will be briefly explained.

First, at the time of initializing, an initializing magnetic field is applied to the second magnetic layer 8. This initializing magnetic field is set to be smaller than the coercive force of the recording layer 81 at room temperature, but larger than the coercive force of the recording supplement layer 83 at room temperature. Accordingly, the initializing magnetic field will not cause inversion of the magnetization of the recording layer 81, but will cause the magnetization of only the recording supplement layer 83 to be aligned in a single direction. The intermediate layer 82 has in-plane magnetic anisotropy at room temperature, and acts to prevent coupling caused by the exchange coupling force of the recording layer 81 and the recording supplement layer 83.

At the time of recording, a light beam power modulated into high power and low power is projected onto the second magnetic layer 8 while a recording magnetic field is applied thereto. The high-power light beam is set so that projecting it onto the second magnetic layer 8 causes the temperature thereof to rise to the vicinity of the Curie temperature of the recording supplement layer 83, and the low-power light beam is set so that projecting it onto the second magnetic layer 8 causes the temperature thereof to rise to the vicinity of the Curie temperature of the recording layer 81.

Accordingly, when the high-power light beam is projected onto the second magnetic layer 8, the recording magnetic field reverses the magnetization of the recording supplement layer 83, and this magnetization is copied, due to an exchange coupling force exerted on the interface during the cooling process, to the intermediate layer 82 (which has perpendicular magnetic anisotropy) and then to the recording layer 81.

On the other hand, when the low-power light beam is projected onto the second magnetic layer 8, the magnetization of the recording supplement layer 83 is not reversed, since the coercive force of the recording supplement layer 83 is larger than the recording magnetic field. The magnetization of the recording layer 81, due to an exchange coupling force exerted on the interface during the cooling process as above, will have the same direction as that of the recording supplement layer 83.

In the manner described above, the magneto-optical memory medium according to the present embodiment can be overwritten without performing an erase operation.

Figure 18:
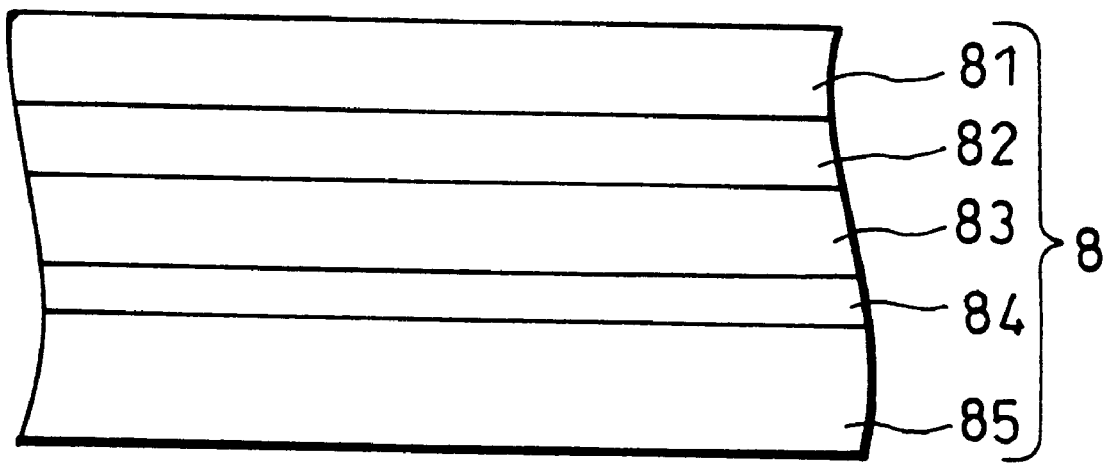
FIG. 18 is a detailed cross-sectional view showing another example of a second magnetic layer of the magneto-optical memory medium shown in FIG. 16.

Next, an example of a second magnetic layer 8 with a different structure will be explained. Here, the second magnetic layer 8, as shown in FIG. 18, is made up of a recording layer 81, an intermediate layer 82, a recording supplement layer 83, a switching layer 84, and an initializing layer 85. In the second magnetic layer 8 in this example, each of the foregoing layers is made up of a plurality of alternating rare earth metal films and transition metal films.

The following will briefly explain a method for making use of four layers that are exchange coupled with one another to perform light modulation overwriting without applying an initializing magnetic field.

At the time of recording, a light beam power modulated into high power and low power is projected onto the second magnetic layer 8 while a recording magnetic field is applied thereto. The high-power light beam is set so that projecting it onto the second magnetic layer 8 causes the temperature thereof to rise to the vicinity of the Curie temperature of the recording supplement layer 83, and the low-power light beam is set so that projecting it onto the second magnetic layer 8 causes the temperature thereof to rise to the vicinity of the Curie temperature of the recording layer 81.

Accordingly, when the high-power light beam is projected onto the second magnetic layer 8, the recording magnetic field reverses the magnetization of the recording supplement layer 83, and this magnetization is copied, due to an exchange coupling force exerted on the interface during the cooling process, to the intermediate layer 82 (which has perpendicular magnetic anisotropy) and then to the recording layer 81. As further cooling occurs, the magnetization of the recording supplement layer 83 becomes aligned with that of the initializing layer 85. The initializing layer 85 has a Curie temperature higher than the temperature to which the second magnetic layer 8 is heated by projection of the light beam thereon, and shows perpendicular magnetization within a range from room temperature up to its Curie temperature.

On the other hand, when the low-power light beam is projected onto the second magnetic layer 8, the magnetization of the recording supplement layer 83 is not reversed, since the coercive force of the recording supplement layer 83 is larger than the recording magnetic field. The magnetization of the recording layer 81, due to an exchange coupling force exerted on the interface during the cooling process as above, will have the same direction as that of the recording supplement layer 83.

In the manner described above, the magneto-optical memory medium according to the present example can be overwritten without performing an erase operation, and without applying an initializing magnetic field.

Next, a concrete example of a magneto-optical memory medium according to the present embodiment will be explained.

In this magneto-optical memory medium, the transparent substrate 1 is made of a polycarbonate disc with an outer diameter of 86 mm, an inner diameter of 15 mm, and a thickness of 1.2 mm. On one surface of the transparent substrate 1 are provided concave guide tracks for guiding the light beam. Each guide track has a track pitch of 1.1 $\mu$m and a groove (concave portion) width of 0.4 $\mu$m, and each land (convex portion) between the grooves is 0.7 $\mu$m wide.

On the surface of the transparent substrate 1 on which the guide tracks are provided are layered, by means of reactive sputtering, the dielectric layer 2 made of AlN of 80 nm thickness, the first magnetic layer 3 made of GdFeCo of 40 nm thickness, the second magnetic layer 8, and the protective layer 5 made of AlN of 40 nm thickness.

As shown in FIGS. 2 and 3, the first magnetic layer 3 is made of alternating Gd films 31, Co films 32, and Fe films 33. Further, as shown in FIG. 17, the second magnetic layer 8 is made up of the recording layer 81 made of TbFeCo of 40 nm thickness, the intermediate layer 82 made of GdFeCo of 30 nm thickness, and the recording supplement layer 83 made of GdTbFeCo of 40 nm thickness.

Here, a magneto-optical memory medium in which the films of the first magnetic layer 3, as shown in FIG. 2, are provided from the transparent substrate 1 side in the order Gd film 31, Co film 32, Fe film 33, will be referred to as Sample #7. In Sample #7, each Gd film 31 is approximately 0.6 nm thick, each Co film 32 approximately 0.3 nm thick, and each Fe film 33 approximately 1.1 nm thick.

Again, a magneto-optical memory medium in which the films of the first magnetic layer 3, as shown in FIG. 3, are provided from the transparent substrate 1 side in the order Gd film 31, Fe film 33, Co film 32, will be referred to as Sample #8. In Sample #8, each Gd film 31 is approximately 0.6 nm thick, each Fe film 33 approximately 1.1 nm thick, and each Co film 32 approximately 0.3 nm thick.

In Samples #7 and #8, the second magnetic layer 8 is made up of the recording layer 81, the intermediate layer 82, and the recording supplement layer 83.

The sputtering conditions for providing the first magnetic layer 3 and the second magnetic layer 8 are an ultimate vacuum of $2.0 \times 10^{-4}$ Pa or less, Ar gas pressure of $6.5 \times 10^{-1}$ Pa, and a discharge power of 300 W, and for providing the dielectric layer 2 and the protective layer 5, they are an ultimate vacuum of $2.0 \times 10^{-4}$ Pa or less, $N_2$ gas pressure of $3.0 \times 10^{-1}$ Pa, and a discharge power of 800 W.

The overcoat film 6 is provided by coating an acrylate ultraviolet-hardened resin on the protective layer 5, and hardening it by projecting ultraviolet light thereon.

In a magneto-optical memory medium prepared as described above, the first magnetic layer 3 was rare earth metal rich, had a Curie temperature (Tc1) of 275° C., and had characteristics whereby it showed in-plane magnetization at room temperature while showing perpendicular magnetization at approximately 140° C. In the second magnetic layer 8, the recording layer 81 was transition metal rich, had a Curie temperature (Tc2) of 225° C., and at room temperature had a coercive force (Hc2) of 1200 kA/m; the intermediate layer 82 was rare earth metal rich, had a Curie temperature (Tc3) of >300° C., and showed in-plane magnetization at room temperature; the recording supplement layer 83 was rare earth metal rich, had a Curie temperature (Tc4) of 275° C., and at room temperature had a coercive force (Hc4) of 160 kA/m.

In Samples #7 and #8, the recording layer 81, the intermediate layer 82, and the recording supplement layer 83 of the second magnetic layer 8 are all alloys of rare earth and transitional metals. Here, a magneto-optical memory medium in which each layer of the second magnetic layer 8 is made up of alternating films of rare earth metals and transition metals will be referred to as Sample #9.

In the second magnetic layer 8 of Sample #9, the recording layer 81 is made up of alternating films of Tb, Fe, and Co; the intermediate layer 82 is made up of alternating films of Gd, Fe, and Co; and the recording supplement layer 83 is made up of alternating films of Gd, Tb, Fe, and Co. The remainder of the structure and manufacturing conditions are the same as in Samples #7 and #8.

Further, as examples of a second magnetic layer 8 with a structure differing from that of Samples #7 through #9, magneto-optical memory mediums in which the second magnetic layer 8, as shown in FIG. 18, is made up of a recording layer 81, an intermediate layer 82, a recording supplement layer 83, a switching layer 84, and an initializing layer 85, will be referred to as Samples #10 and #11. In Sample #10, the recording layer 81 is made of a Tb, Fe, Co alloy of 40 nm thickness; the intermediate layer 82 is made of a Gd, Fe, Co alloy of 30 nm thickness; the recording supplement layer 83 is made of a Gd, Tb, Fe, Co alloy of 40 nm thickness; the switching layer 84 is made of a Tb, Al, Fe alloy of 20 nm thickness; and the initializing layer 85 is made of a Gd, Tb, Fe, Co alloy of 60 nm thickness. In Sample #11, in contrast, each layer of the second magnetic layer 8 is not an alloy, but is made up of alternating films of rare earth metals and transition metals. The remainder of the structure and manufacturing conditions of Samples #10 and #11 are the same as in Samples #7 through #9.

Further, magneto-optical memory mediums the same as those in Samples #7 through #11, but in which a dielectric layer 7 is provided between the first magnetic layer 3 and the second magnetic layer 8, will be referred to as Samples #12 through #16, respectively. The sputtering conditions for providing the dielectric layer 7 are the same as those for the dielectric layer 2 above.

Figure 19:
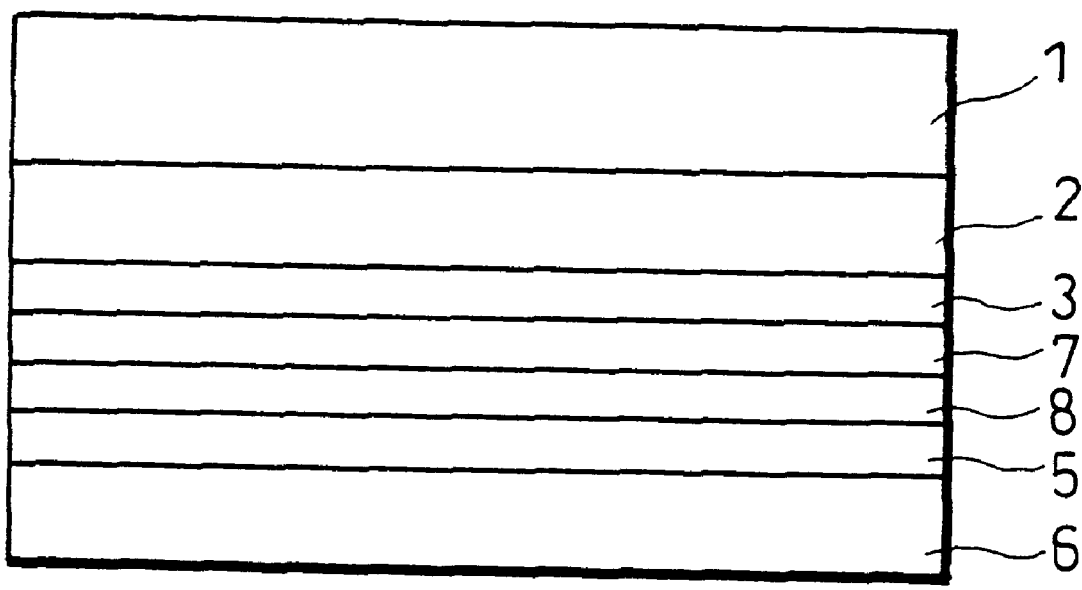
FIG. 19 is an explanatory diagram showing another structure for the magneto-optical memory medium according to the third embodiment of the present invention.

In other words, the magneto-optical memory mediums in Samples #12 through #16, as shown in FIG. 19, are structured so that a transparent dielectric layer 2, a first magnetic layer 3, a dielectric layer 7, a second magnetic layer 8 (light modulation overwrite layer), and a protective layer 5 are layered, in that order, on a transparent substrate 1. Further, an overcoat film 6 is generally provided on the protective layer 5 in order to protect the magneto-optical memory medium. The remainder of the structure and manufacturing conditions of Samples #12 through #16 are the same as in Samples #7 through #11.

Next, with a recording magnetic field (Hw) of −40 kA/m, a light beam with a recording power (Pw) of 6 mW was repeatedly projected onto the magneto-optical memory mediums of Samples #7 through #16, measuring the relation of number of cyclic times to CNR, and the relation of reproducing power to CNR.

Figure 20:
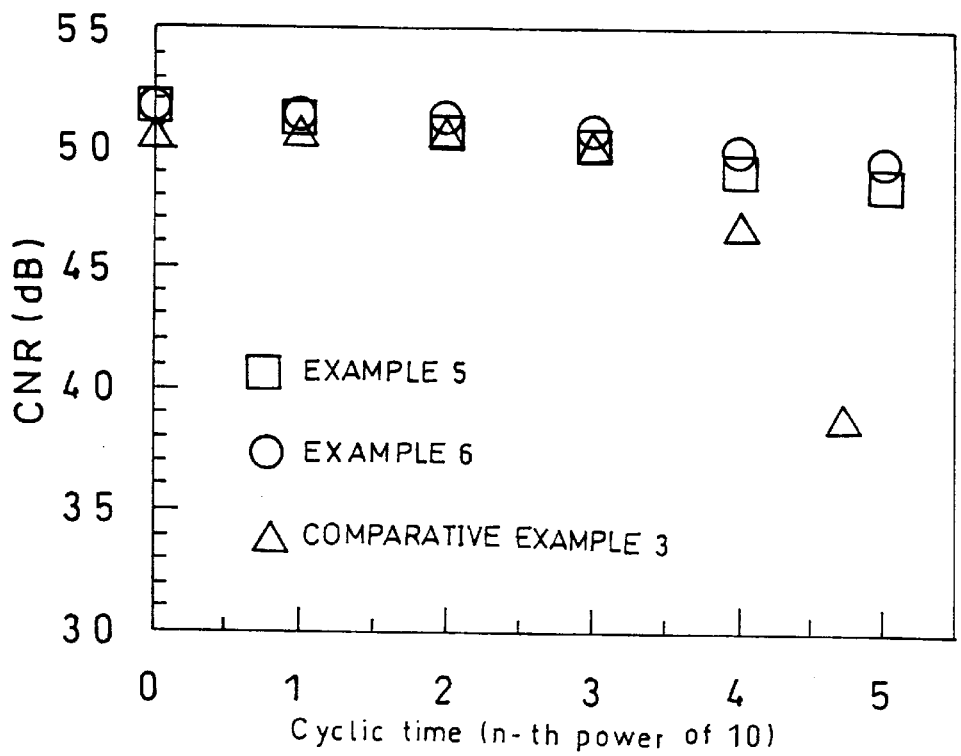
FIG. 20 is an explanatory diagram showing the relation between recording cyclic times and CNR in the magneto-optical memory medium according to the third embodiment of the present invention.
Figure 21:
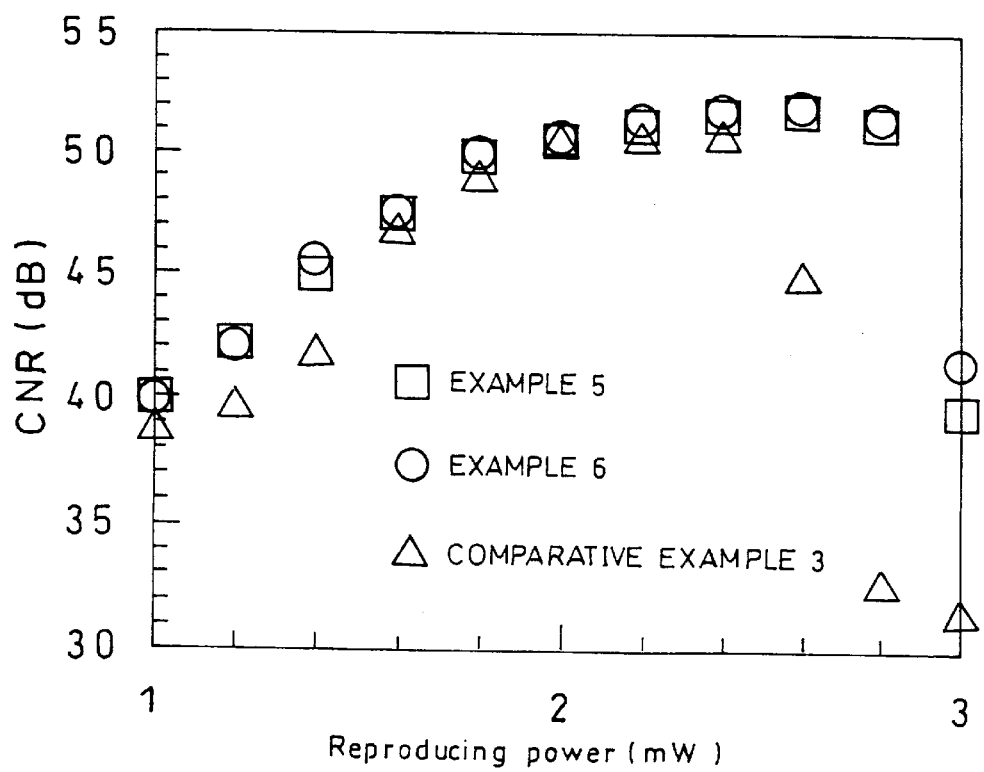
FIG. 21 is an explanatory diagram showing the relation between reproducing power and CNR in the magneto-optical memory medium according to the third embodiment of the present invention.
Figure 22:
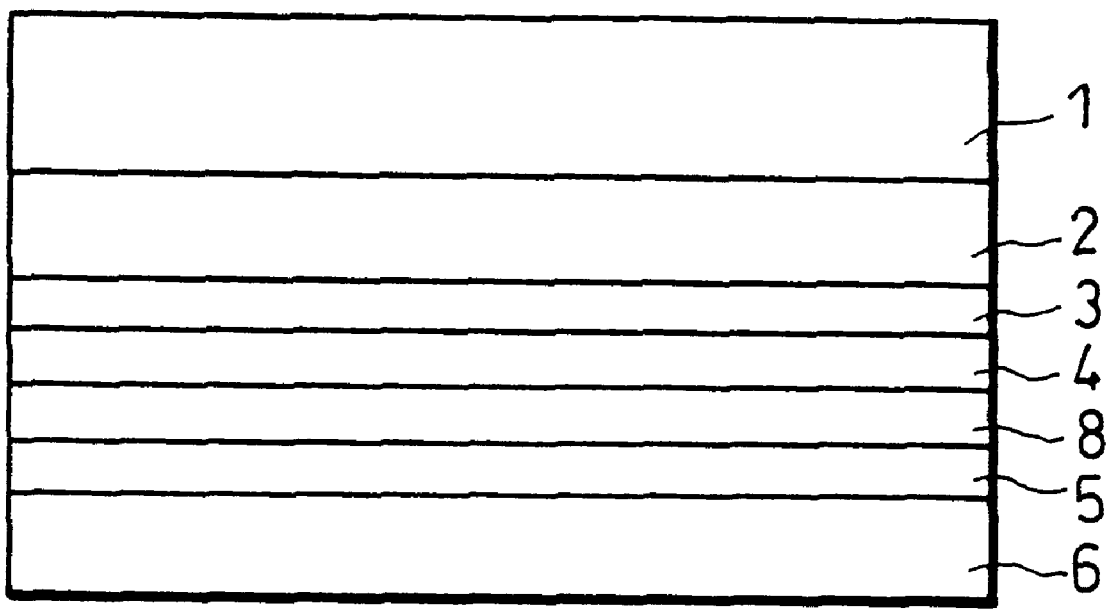
FIG. 22 is an explanatory diagram showing a structure for the magneto-optical memory medium shown in FIGS. 16 and 19, in which neither the first nor second magnetic layer is made up of alternating films of rare earth metals and transition metals.

The results are shown in FIGS. 20 and 21. The characteristics of Samples #7 through #11 were nearly the same, and thus are indicated on FIGS. 20 and 21 as "Example 5." The characteristics of Samples #12 through #16 were nearly the same, and thus are indicated on FIGS. 20 and 21 as "Example 6." An example of the conventional art is also plotted as "Comparative Example 3." In the magneto-optical memory medium of Comparative Example 3, as shown in FIG. 22, the first magnetic layer 3 and the second magnetic layer 8 are provided as alloys by means of the typical simultaneous sputtering.

It can be seen from FIG. 20 that the CNRs of Examples 5 and 6 have deteriorated little even after $1 \times 10^5$ projections, but that of Comparative Example 3 has deteriorated after $5 \times 10^4$ projections. Further, it can be seen from FIG. 21 that Examples 5 and 6 have wider reproducing power margins (ranges of useable laser power) than does Comparative Example 3.

Incidentally, the structure of the second magnetic layer 8 need not be limited to those described in the present embodiment, and may have any of the following structures:

recording layer/recording supplement layer;

recording layer/intermediate layer/recording supplement layer;

recording layer/recording supplement layer/switching layer/initializing layer; or recording layer/intermediate layer/recording supplement layer/switching layer/initializing layer.

The magneto-optical memory mediums according to each of the embodiments discussed above are structured so that at least the first magnetic layer 3 is made up of alternating films of rare earth metals and transition metals. Therefore, the temperature at which the magnetization of the first magnetic layer 3 shifts is higher than in the conventional alloy structures.

Accordingly, even if the light beam is projected onto the magneto-optical memory medium at a higher output than in conventional structures, the CNR of the reproduction signal can be maintained at a level as high as in the conventional structures, and the reproduction laser margin can be widened. Thus the magneto-optical memory medium will not be likely to malfunction due to fluctuations in laser power, and design of the recording and reproduction device will be easier. Further, the magnetization of the second magnetic layer can be copied to the first magnetic layer more stably, allowing improved reproduction characteristics. Again, even with repeated laser projection, deterioration of characteristics can be held to a minimum, and the reliability of the magneto-optical memory medium can be improved.

In addition to the first magnetic layer 3, by also giving the second magnetic layer 4 a structure of alternating films of rare earth metals and transition metals, reproduction characteristics can be further improved.

Further, separating the first magnetic layer 3 from the second magnetic layer 4 (in the third embodiment, the recording layer 81 of the second magnetic layer 8) by the dielectric layer 7, provides a structure which can avoid interference between adjacent magnetic layers at the interface thereof. For this reason, it becomes possible to improve the CNR and limit crosstalk.

Each of the embodiments discussed an example of a first magnetic layer 3 made up of alternating Gd films 31, Fe films 33, and Co films 32 of approximately 0.6 nm, 1.1 nm, and 0.3 nm thickness, respectively. However, the same results may be obtained with other thicknesses, provided that the ratio among the films of the three constituent metals is the same. For example, even a magneto-optical memory medium in which each Gd film 31 was approximately 1.2 nm, each Fe film 33 approximately 2.2 nm, and each Co film 32 approximately 0.6 nm, was able to increase the reproducing power margin and limit deterioration of characteristics due to repeated laser projection. However, if the thickness of any of these Gd, Fe, or Co films is more than 6 nm, it becomes difficult to obtain a first magnetic layer 3 with the required characteristics, namely in-plane magnetization at room temperature and a shift to perpendicular magnetization in response to the temperature rise. Accordingly, for the first magnetic layer 3, it is preferable to use films of each constituent metal which are 6 nm thick or less.

In the examples above, the desired effects were obtained by maintaining an appropriate ratio among films of the three metals making up the first magnetic layer 3, but if the ratios of concentration of the rare earth metals and transition metals are controlled appropriately, so that the concentration of each metal periodically increases and decreases, the same effects can be obtained even without the above ratio among films. In other words, it is sufficient if the first magnetic layer 3 is formed so that the rare earth metals and transition metals are layered periodically, so that the ratio of concentration of each metal in each period is a predetermined value.

Further, the present invention is not limited to the materials, material thicknesses, methods of manufacturing, etc. explained in the foregoing embodiments.

The concrete embodiments and examples of implementation discussed in the foregoing detailed explanations of the present invention serve solely to illustrate the technical details of the present invention, which should not be narrowly interpreted within the limits of such concrete examples, but rather may be applied in many variations without departing from the spirit of the present invention and the scope of the patent claims set forth below.

What is claimed is:

1. A magneto-optical memory medium comprising, on a substrate, a first magnetic layer, which shows in-plane magnetization at room temperature and perpendicular magnetization above a certain temperature, and a second magnetic layer, which shows perpendicular magnetization within a range from room temperature up to its Curie temperature, wherein:

said first magnetic layer is made up of alternating films of rare earth metals and transition metals.

2. The magneto-optical memory medium set forth in claim 1, wherein:

each said film making up said first magnetic layer is made of a single chemical element.

3. The magneto-optical memory medium set forth in claim 1, wherein:

said second magnetic layer is made up of alternating films of rare earth metals and transition metals.

4. The magneto-optical memory medium set forth in claim 1, wherein:

each said film making up said first magnetic layer is 6 nm or less in thickness.

5. The magneto-optical memory medium set forth in claim 1, further comprising:

a dielectric layer provided between said first and second magnetic layers.

6. The magneto-optical memory medium set forth in claim 1, wherein:

the ratios of concentration of the rare earth metals and transition metals making up said first magnetic layer increase and decrease periodically.

7. A magneto-optical memory medium comprising:

a first magnetic layer made up of alternating films of rare earth metals and transition metals; and a second magnetic layer including a recording layer and a recording supplement layer;

said first magnetic layer showing in-plane magnetization at room temperature and perpendicular magnetization above a certain temperature; and said recording layer having a higher Curie temperature than said recording supplement layer, and showing perpendicular magnetization within a range from room temperature up to its Curie temperature.

8. The magneto-optical memory medium set forth in claim 7, wherein:

each said film making up said first magnetic layer is made of a single chemical element.

9. The magneto-optical memory medium set forth in claim 7, wherein:

said respective recording and recording supplement layers of said second magnetic layer are made up of alternating films of rare earth metals and transition metals.

10. The magneto-optical memory medium set forth in claim 7, wherein:

each said film making up said first magnetic layer is 6 nm or less in thickness.

11. The magneto-optical memory medium set forth in claim 7, further comprising:

a dielectric layer provided between said first magnetic layer and said recording layer.

12. The magneto-optical memory medium set forth in claim 7, wherein said second magnetic layer further includes:

an initializing layer which has a Curie temperature higher than a temperature to which said second magnetic layer is heated when a light beam is projected thereon, and which shows perpendicular magnetization within a range from room temperature up to its Curie temperature.

13. The magneto-optical memory medium set forth in claim 7, wherein:

the ratios of concentration of the rare earth metals and transition metals making up said first magnetic layer increase and decrease periodically.

* * * * *